Sept. 4, 1956 H. COANDA ET AL 2,761,292
DEVICE FOR OBTAINING FRESH DRINKABLE WATER
Filed April 16, 1953 3 Sheets-Sheet 1
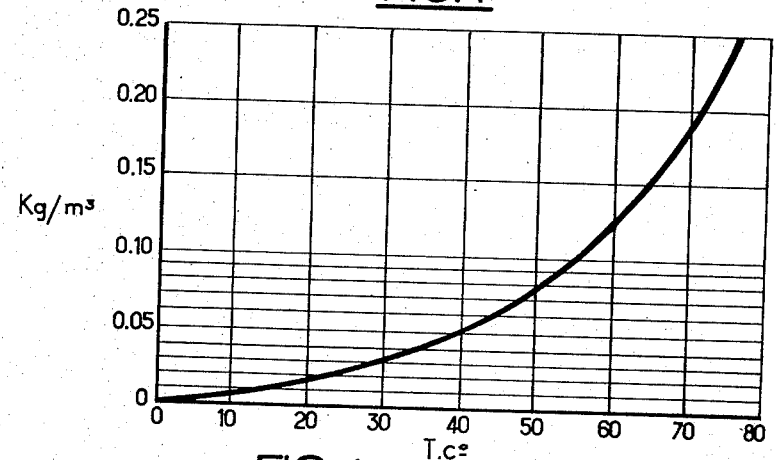
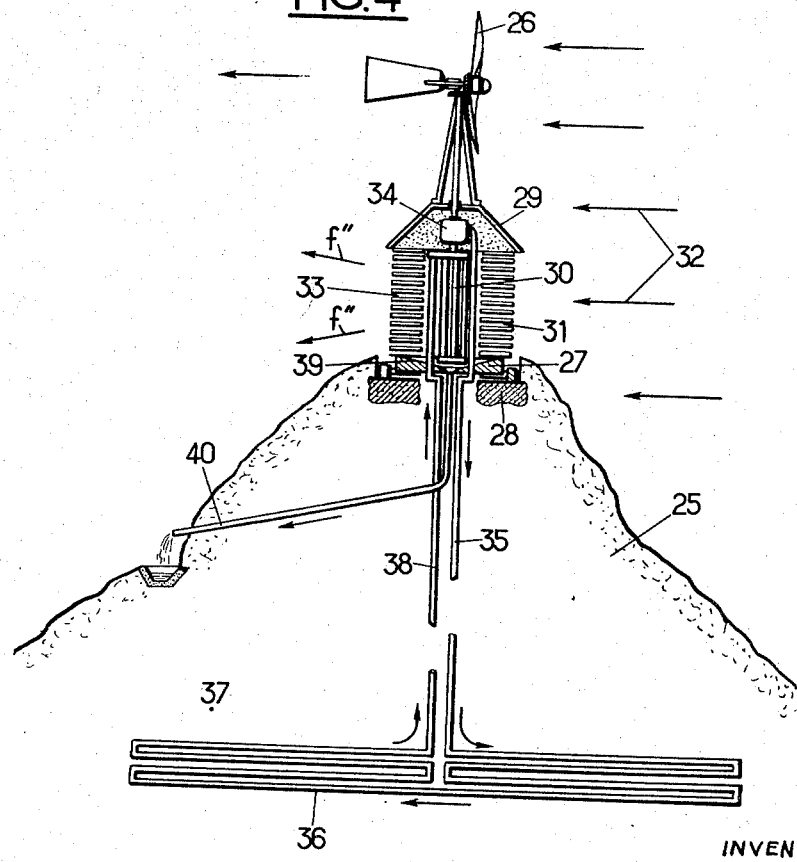
INVENTORS
Henri Coanda
Marguerite Coanda
ATTORNEYS

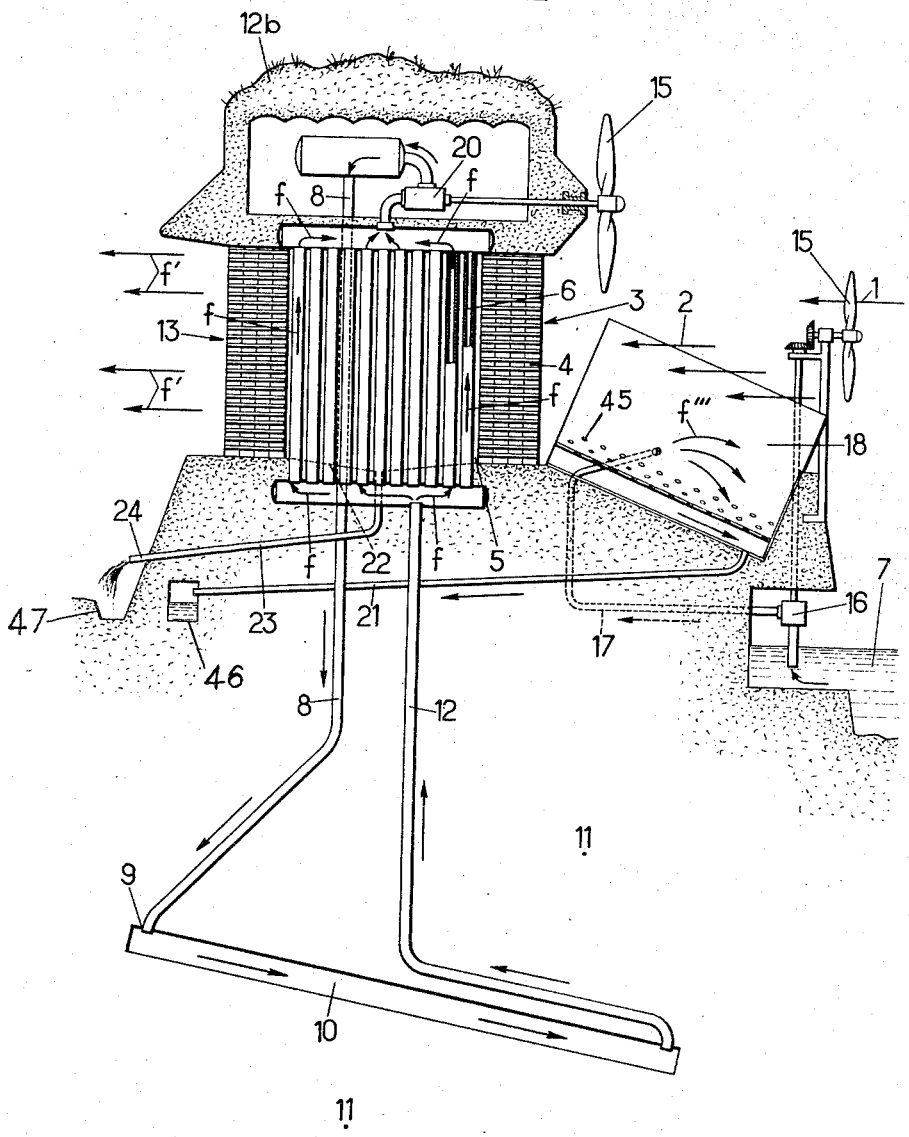

Sept. 4, 1956     H. COANDA ET AL     2,761,292
DEVICE FOR OBTAINING FRESH DRINKABLE WATER
Filed April 16, 1953     3 Sheets-Sheet 3

INVENTORS
Henri Coanda
Marguerite Coanda

ATTORNEYS

United States Patent Office 2,761,292
Patented Sept. 4, 1956

2,761,292

DEVICE FOR OBTAINING FRESH DRINKABLE WATER

Henri Coanda and Marguerite H. Coanda, nee Lecca, Paris, France

Application April 16, 1953, Serial No. 349,244

Claims priority, application France April 18, 1952

4 Claims. (Cl. 62—140)

The present invention relates to a device for obtaining fresh drinkable water, especially in places where this commodity is lacking, and this under very economical conditions by utilizing the available natural sources of energy. One can thus render fertile and habitable regions formerly barren due to the absence of drinkable water.

It is known that the air contains water and according to my invention the energy for precipitating this water vapour can be taken from the air itself in motion. It is known that for a given temperature a given volume of air may contain not more than a certain quantity of water vapor. When it contains this quantity it is said to have reached its saturation point. Moreover, this point varies with the temperature, and the cooler the air, the less water vapor it may contain for a given volume.

Consequently, when a relatively warm volume of moist air is cooled to a sufficiently low temperature, it yields the water it contained in excess over the quantity permitted by the saturation point at the temperature to which it has been cooled.

In a continuous process of producing fresh water, it is necessary to absorb the heat derived from the warm moist air at a speed corresponding to the rate of cooling.

According to the invention, a warm wind of a given degree of humidity (if possible near its saturation point) is made to pass through a heat-exchanger or cooling radiator in which circulates a fluid having a sufficiently low temperature to reduce the temperature of the air coming in contact with said heat exchanger below its dew point, that is, below the minimum temperature at which it is capable of retaining all of the water vapor therein, so that the excess water resulting from the difference between its degree of humidity and the saturation point corresponding to the temperature of the fluid circulating through the radiator disposed in the path of the wind condenses out on the radiator. The circulating fluid absorbs the heat resulting from the condensation of the fresh water and carries said heat to a point sufficiently far beneath the surface of the ground that its temperature is lower than the temperature corresponding to the saturation point of the water in the moist wind.

For example, one cubic meter of air from a wind whose temperature is about 40° C. can contain up to about 50 grams of water vapour; if the wind is forced to enter a certain space by passing along the heat conducting walls of a heat-exchanger or radiator in which a fluid circulates at the temperature existing 7 or 8 meters below ground level, that is of about 11° C., this wind will immediately precipitate on the radiator walls the portion of its water content which is in excess of that permitted by its saturation point at the cooler temperature, that is, about 40 grams per cubic meter of air, as the saturation point of air at 11° C. is 10 grams per cubic meter. The heat given off, which must be carried away by the fluid in the radiator, represents approximately 32 calories for said one cubic meter of air. To transfer these 32 calories into the ground, in view of the low heat conductivity of the soil, it is advisable to pass the fluid through a second radiator or heat-exchanger of large dimensions disposed in the ground at a certain depth.

If the humidity of the warm air is definitely below 50 grams of water per cubic meter, that is, if the air is far from its saturation limit, and if the device for obtaining fresh water is disposed near the sea, it is possible to use the kinetic energy of the wind for driving a suitable device for spraying sea water into the warm air in not too fine droplets, thereby increasing the amount of water contained in the warm air through the partial evaporation of the sea water thereinto.

According to another feature of the invention, the walls of the radiator have a sufficiently large surface and a suitable heat-transfer constant, so that all heat given off by the water vapor condensation into water on said walls may be absorbed by the circulating fluid and conveyed to the second radiator sunk in the ground, the energy required for that circulation being drawn preferably from the kinetic energy of the wind by mechanical means, e. g. wind-mills, thus providing for the control of the quantity of the circulating fluid in proportion to the quantity of air arriving at the first radiator.

It is therefore an object of the invention to provide a device for obtaining fresh drinkable water from moist warm wind by cooling said wind to a temperature lower than the temperature at which the saturation point of the moist air is equal to the content in water of said wind so that said wind yields the excess water and by using preferably for this purpose only the kinetic energy of said wind and the thermic energy of the sun.

It is another object of the invention to provide a device for obtaining drinkable water from a moist warm wind according to the above-mentioned method comprising a chamber provided with openings for the entry and exit of said wind, a first cooling radiator in said chamber, a second cooling radiator situated below the level of the soil at a certain distance thereof, conduits for connecting said first radiator to said second radiator, and pumps for maintaining in circulation a fluid through said first and second radiators and said conduits.

The aforesaid and other objects, features and advantages of the invention will be more easily and fully understood from the illustration of two embodiments of an installation according to the invention, being understood that the invention is not restricted to the details of the illustrated and described embodiments but that is susceptible to modifications and adaptations.

In the attached drawings:

Fig. 1 shows the saturation curve of most air.

Fig. 2 is a vertical section through a first embodiment of a device according to the invention in a region situated near the sea.

Fig. 4 is a vertical section through a second embodiment, according to the present invention, of a device for supplying fresh water situated on a hill.

Figure 3:
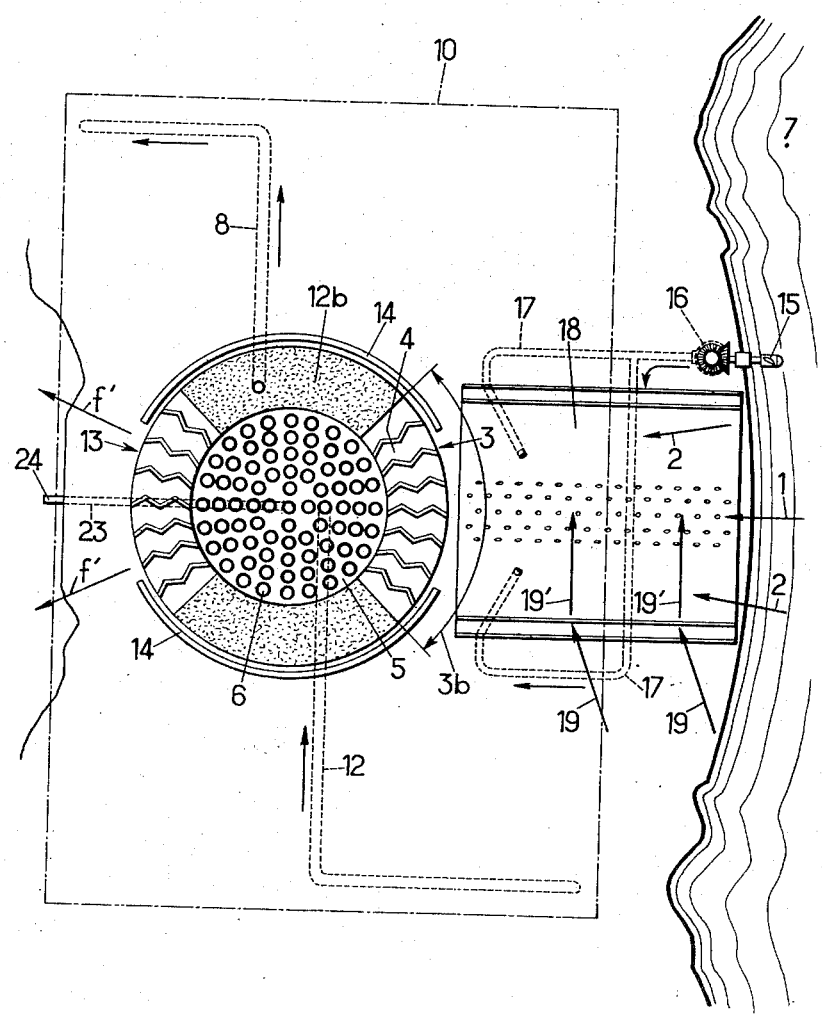
Fig. 3 is a top view of the same embodiment.

In Fig. 1 the weights of water (in kilograms) contained by a cubic meter of air are plotted against the temperatures (in degrees centigrade) of said air. The curve gives the saturation limit at the various temperatures, that is, the maximum quantity of water (in kilograms) that may be carried by a cubic meter of air at a given temperature and under the atmospheric pressure.

Reference is made now to Figs. 2 and 3 representing a first embodiment of the invention located, near the sea.

The wind 1 blowing in the direction indicated by arrows 2 meets at 3 a device which allows the passage of the dominant wind in the area $3^b$. The air enters through the openings 4 and traverses the chamber 5, in which a heat-exchanger or cooling radiator is provided, formed by hollow elements 6, through which circulates, as shown by the arrows $f$, a fluid that after passing through the conduit 8 reaches at 9 a second heat-exchanger or cooling radiator 10, which delivers its heat to the earth 11. The fluid, having been cooled, returns via the conduit 12 to the hollow elements 6. In order to maintain a reduced temperature in the chamber 5, said chamber is insulated by insulating elements 12$^b$. Movable vanes 14, displaced by means not shown, are provided to prevent the lateral arrival of air from another direction than the direction in which the wind is blowing (direction of arrows 2). The wind leaves chamber 5 at 13 as shown by arrows $f'$. The flowing of air at 13 creates a suction which aids the exit of the air from chamber 5.

Wind-mills 15 are provided, one wind-mill to drive the pump 16, which forces sea water (drawn from the sea 7) along the pipes 17 (sea water arriving by pipes 17 is sprayed into the container 18 as shown by arrows $f'''$) and a second wind-mill to drive the pump 20 which maintains the circulation of the fluid through the hollow elements 6. The container 18 may be parabolic in cross-section so as to concentrate the rays of the sun along its focal line, thus heating the incoming air as it passes through the area including this line so that it will absorb a greater portion of the sea water which is sprayed into the same area through the pipes 17. The sea water which is not absorbed by the incoming air being deprived of condensed pure water and therefore containing a higher concentration of mineral salts and other chemical constituents leaves said container 18 through the holes 45, the pipe 21, and the drain 46. It is relatively inexpensive to extract said mineral salts and other chemical constituents from said sea water deprived of the condensed pure water because very few calories per gram of salts and constituents are necessary for the evaporation of a small quantity of water.

In the chamber 5 the fresh pure water which trickles along the hollow elements 6 is collected at 22 and reaches, via the conduit 23, the point of discharge 24 constituting a source of fresh drinkable water obtained according to the invention. This water may be conducted to any desired point through ditch 47.

In one embodiment of the invention, devices may be provided for concentrating by means of a series of mirrors the sun's rays 19 as shown in Figure 3 at 19′ on the air in motion, i. e. the utilized wind, before the sea water is sprayed into the container 18, thereby allowing the absorption of a greater quantity of sea water by the air blowing as shown by the arrows 2 in Figure 3.

Fig. 4 shows a second preferred embodiment of the invention, when it is possible to use a hill 25 for installing a wind-mill 26. The wind-mill 26 and the unburied portion of the device according to the invention are preferably mounted on a structure 27 which can revolve on a platform 28 in order to enable the orientation of the wind-mill and of the heat-exchanger 30 according to the direction of the wind. Inside a structure 29, which supports the wind-mill 26, is disposed the heat-exchanger or cooling radiator 30 completely insulated from the surroundings except in the directions of entrance 32 and exit $f''$ of the wind. The wind coming in the direction of arrows 32 enters by the opening 31 and leaves at 33 as shown by arrows $f''$, after having precipitated fresh drinkable water on the walls of the cooling radiator 30.

The wind-mill 26 actuates a pump 34, which causes a fluid to circulate through the heat-exchanger 30 and through a second heat-exchanger 36 sunk deep in the earth 37, where a relatively cold temperature prevails, said heat-exchangers being connected by conduits 35 and 38. The water deposited on the walls of the radiator 30 collects in container 39 and is directed by the conduit 40 to its point of emergence as fresh drinkable water.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

What we claim is:

1. A device for obtaining fresh drinkable water from a moist warm wind comprising an enclosed chamber, provided with an orientable entry opening for said wind, and with an orientable exit opening for said wind, a first cooling radiator including an internal portion and an external surface, said first radiator being disposed in said chamber with said external surface thereof in the passageway of said warm moist wind, a second cooling radiator including an internal portion and an external surface, said second radiator being disposed at a certain depth in the soil with said external surface thereof in intimate contact with said soil, a couple of conduits forming with said internal portion of said first radiator and with said internal portion of said second radiator a closed circuit each portion of which is in free communication with all other portions thereof, a fluid in said closed circuit, means for circulating said fluid in said closed circuit and means for collecting the water deposited by said moist warm wind on said external surface of said first radiator.

2. A device as claimed in claim 1 wherein said entry opening and said exit opening are orientated in order to prevent any external radiation to strike said external surface of said first radiator.

3. A device for obtaining fresh drinkable water from a moist warm wind comprising an enclosed chamber, provided with an orientable entry opening for said wind and with an orientable exit opening for said wind, a first cooling radiator including an internal portion and an external surface, said first radiator being disposed in said chamber with said external surface thereof in the passageway of said warm moist wind, a second cooling radiator including an internal portion and an external surface, said second radiator being disposed at a certain depth in the soil with said external surface thereof in intimate contact with said soil, a couple of conduits forming with said internal portion of said first radiator and with said internal portion of said second radiator a closed circuit, a fluid in said closed circuit, means for circulating said fluid in said closed circuit, means for collecting the water deposited by said moist warm wind on said external surface of said first radiator and means for spraying available undrinkable water into said wind before it enters said chamber.

4. A device as claimed in claim 1 in which the means for circulating fluid in said circuit is driven by the wind from which the fresh water is being obtained so that the speed with which the fluid is circulated through said first radiator varies proportionately with the flow of air past it.

References Cited in the file of this patent

UNITED STATES PATENTS

| | | |
|---|---|---|
| 661,944 | Belden | Nov. 20, 1900 |
| 1,653,604 | Schroden | Dec. 20, 1927 |
| 2,181,953 | Usselman | Dec. 5, 1939 |
| 2,307,292 | Palmer | Jan. 5, 1943 |
| 2,513,373 | Sporn | July 4, 1950 |
| 2,652,699 | Romani | Sept. 22, 1953 |

FOREIGN PATENTS

| | | |
|---|---|---|
| 272,668 | Italy | Mar. 17, 1930 |
| 638,947 | Great Britain | June 21, 1950 |